(12) United States Patent
Bastin et al.

(10) Patent No.: US 9,938,399 B2
(45) Date of Patent: Apr. 10, 2018

(54) WELD SEAM FOR GROUND COATING

(75) Inventors: Pierre Bastin, Wiltz (LU); Richard Peres, Bastogne (BE); Nicolas Roelly, Plaine (FR)

(73) Assignee: Tarkett SAS, Nanterre (FR)

( * ) Notice: Subject to any disclaimer, the term of this patent is extended or adjusted under 35 U.S.C. 154(b) by 741 days.

(21) Appl. No.: 12/742,329

(22) PCT Filed: Nov. 12, 2008

(86) PCT No.: PCT/EP2008/065397
§ 371 (c)(1),
(2), (4) Date: Aug. 31, 2010

(87) PCT Pub. No.: WO2009/062962
PCT Pub. Date: May 22, 2009

(65) Prior Publication Data
US 2010/0316829 A1 Dec. 16, 2010

(30) Foreign Application Priority Data

Nov. 14, 2007 (EP) ..................................... 07022062

(51) Int. Cl.
*B32B 3/00* (2006.01)
*B32B 37/00* (2006.01)
(Continued)

(52) U.S. Cl.
CPC .............. *C08L 23/06* (2013.01); *B29C 65/12* (2013.01); *B29C 66/1142* (2013.01);
(Continued)

(58) Field of Classification Search
CPC ... B29C 66/1142; B29C 66/006; B29C 66/00; B29C 66/71; B29K 2021/00; B29K 2023/00; B29K 2023/06; B29K 2023/083; B29K 2027/06; B29K 2033/04; B29K 2033/08; B29K 2033/12; B29K 2035/00; B29K 2075/00; B29K 2077/00; B29K 2101/12; B29K 2105/0085; B29K 2711/04; B29K 2031/04; C08L 23/06; C08L 23/0876; C08L 177/00; C08L 2666/02; C08L 33/02; C08L 77/00; C08L 23/08; C08L 2666/04; C08L 2666/20; C08L 23/00; C08L 23/02; C08L 23/0853; C08L 31/04; C08L 91/06; C08L 23/0869; C08L 51/06;
(Continued)

(56) References Cited

U.S. PATENT DOCUMENTS 3,658,741 A * 4/1972 Knutson et al. ............... 523/309
4,132,690 A * 1/1979 Eernstman et al. .......... 524/270
(Continued)

FOREIGN PATENT DOCUMENTS

EP 1 567 336 8/2005
EP 1 953 202 A1 8/2008
(Continued)

*Primary Examiner* — Hai Vo
(74) *Attorney, Agent, or Firm* — Reinhart Boerner Van Deuren P.C.

(57) ABSTRACT

The invention relates to a heat-fusible weld seam for joining ground coating members, comprising a copolymer selected from the group of polymers containing acrylic acid, methacrylic acid or maleic anhydride, a polyethylene and a copolyamide.

8 Claims, 5 Drawing Sheets

(51) Int. Cl.
C08L 33/02 (2006.01)
C08L 77/00 (2006.01)
C08L 23/06 (2006.01)
B29C 65/12 (2006.01)
B29C 65/00 (2006.01)
C08L 23/08 (2006.01)
B29C 65/82 (2006.01)
B29K 21/00 (2006.01)
B29K 23/00 (2006.01)
B29K 27/06 (2006.01)
B29K 33/04 (2006.01)
B29K 33/00 (2006.01)
B29K 35/00 (2006.01)
B29K 75/00 (2006.01)
B29K 77/00 (2006.01)
B29K 101/12 (2006.01)
B29K 105/00 (2006.01)
B29K 711/04 (2006.01)

(52) U.S. Cl.
CPC ............ B29C 66/43 (2013.01); B29C 66/435 (2013.01); B29C 66/71 (2013.01); B29C 66/73115 (2013.01); B29C 66/73121 (2013.01); B29C 66/73921 (2013.01); B29C 66/836 (2013.01); B29C 66/861 (2013.01); C08L 23/0876 (2013.01); B29C 65/125 (2013.01); B29C 65/8207 (2013.01); B29K 2021/00 (2013.01); B29K 2023/00 (2013.01); B29K 2023/06 (2013.01); B29K 2023/083 (2013.01); B29K 2027/06 (2013.01); B29K 2033/04 (2013.01); B29K 2033/08 (2013.01); B29K 2033/12 (2013.01); B29K 2035/00 (2013.01); B29K 2075/00 (2013.01); B29K 2077/00 (2013.01); B29K 2101/12 (2013.01); B29K 2105/0085 (2013.01); B29K 2711/04 (2013.01); C08L 77/00 (2013.01); Y10T 156/10 (2015.01); Y10T 428/192 (2015.01)

(58) Field of Classification Search
CPC ............ C08L 23/0815; C08L 2205/03; C08L 2205/02; B29L 2031/732; B29L 2031/776; C08G 69/34; C08G 69/40; C08G 69/00; C08G 81/00; C08G 81/02; C08G 69/265; C09J 123/08; C09J 177/00; C09J 3/14; C09J 123/00; C09J 177/06; C09J 123/26; C09J 151/06; C09J 123/0815; C09J 123/04; B31F 5/04; B32B 3/00; B32B 37/00; C08F 8/30; D04H 1/42; D04H 1/46; D04H 1/48; D04H 1/54; D04H 1/541; D04H 1/549; D04H 1/55; D04H 1/58; D04H 1/593; D04H 1/544; D04H 13/00; D06N 7/0036; D06N 7/00
USPC ........ 428/57, 58, 292.1, 413, 349, 364, 142, 428/35.7, 323, 411.1, 143, 97, 335, 332, 428/395, 461; 524/270, 277, 563, 77, 524/271, 504, 240, 489, 499, 488, 487, 524/478, 274, 523, 461, 514, 304; 525/92 A, 308, 285, 183, 74, 301, 78, 525/178, 211, 210, 227; 528/338, 339, 528/339.5, 341, 336, 349; 523/309
See application file for complete search history.

(56) References Cited

U.S. PATENT DOCUMENTS

| | | | | |
|---|---|---|---|---|
| 4,140,733 A | * | 2/1979 | Meyer et al. | 524/304 |
| 4,218,509 A | * | 8/1980 | Edgar | C08G 69/26 525/432 |
| 4,282,346 A | * | 8/1981 | Sharkey | 528/338 |
| 4,521,484 A | * | 6/1985 | Li | D01F 8/12 428/370 |
| 4,567,223 A | * | 1/1986 | Ames | C09J 151/06 524/487 |
| 4,791,164 A | * | 12/1988 | Wichelhaus et al. | 524/514 |
| 5,753,767 A | | 5/1998 | Ward | |
| 5,891,987 A | * | 4/1999 | Yuo | B32B 27/34 525/432 |
| 6,451,912 B1 | * | 9/2002 | Kelch | 525/66 |
| 7,767,760 B2 | * | 8/2010 | Chou | 525/207 |
| 2003/0015282 A1 | * | 1/2003 | Reisdorf et al. | 156/244.11 |
| 2003/0199635 A1 | * | 10/2003 | Court et al. | 525/178 |

FOREIGN PATENT DOCUMENTS

| | | |
|---|---|---|
| GB | 1 440 810 | 6/1976 |
| GB | 2 321 059 A | 7/1998 |
| GB | 2 322 097 A | 8/1998 |
| JP | 2000-280349 A | 10/2000 |
| JP | 2002114877 A * | 4/2002 |
| JP | 2005-054001 A | 3/2005 |
| WO | WO 2004-067668 A1 | 8/2004 |
| WO | WO 2007-009733 A1 | 1/2007 |

* cited by examiner

WELD SEAM FOR GROUND COATING

CROSS-REFERENCE TO RELATED APPLICATIONS

This patent application is the National Stage of International Application No. PCT/EP2008/065397, filed Nov. 12, 2008, that claims the benefit of European Application No. 07022062.9, filed Nov. 14, 2007, the entire teachings and disclosure of which are incorporated herein by reference thereto.

OBJECT OF THE INVENTION

This invention relates to a hot-melt welding rod for floor coverings, and utilisation of such a welding rod with floor coverings.

PRIOR ART

For the decoration of interior and exterior surfaces, e.g. in a building or dwelling place, it is common to use decorative surface coverings because they are more pleasing, look better and are more comfortable than bare or simply painted surfaces. Surface coverings are well known. Generally, such surface coverings are, for example, polyolefins-based, polyvinyl chloride-based (PVC), linoleum or rubber-based.

Usually, surface coverings—especially floor coverings—are supplied in the form of elements—strips or tiles—which, once positioned and/or fixed to the surface to be covered, have to be joined or fixed to one another. Using a hot-melt welding rod to join or fix the sub-units of a floor covering together is well known.

Conventionally, the hot-melt welding rod (which is usually cylindrical in shape) is introduced into the welding nozzle of a hot-air welding device which heats the rod material up, enabling it to penetrate into the spaces between adjacent elements of the floor covering. Once cool, any excess rod material can be scraped off using a quarter-moon knife.

Most hot-melt welding rods are made of a polymer or copolymer that has adhesive power at a lower temperature than that of the composition of the covering elements.

A hot-melt welding rod for floor coverings has to fulfil a whole series of different requirements, many of which are contradictory in that the characteristics required for easy application are not necessarily compatible with those for easy cleaning and upkeep.

Thus, for easy application at the time of welding, the polymer composition of the welding rod should ensure low viscosity at high temperature, and the material should have a high polarity and potent sticking capacity without being "slippery" to the touch. Subsequently, once the material has cooled down and excess has to be scraped off, its mechanical resistance to cutting has to be relatively low and its "elastic return" should be as low as possible. The welding rod material should stick strongly to the sub-units it is sticking together and resist shear forces.

In contrast, for easy cleaning, the composition of the rod once in place has to have a high viscosity so that it resists abrasion, and it has to be flexible, i.e. have good elastic return. It should have a low polarity and should not bind dirt particles and stain. Therefore, it has to be adherent enough to join the flooring sub-units together and seal them, but not so sticky that it attracts dirt (dust, grease and other materials). Moreover, it should not stick to either the welding nozzle of the hot-air welding device or the metal parts of the extrusion or injection device used in its manufacture. This means that the composition has to change some of its characteristics when it cools down, with partial crystallisation.

In addition, most of today's floor coverings comprise a surface treatment with polyurethane or an acrylic resin to form a protective varnish to which little sticks and which protects the coverings against staining and physical damage. This considerably complicates the problem of having to reconcile the various contradictory characteristics mentioned in the previous paragraph, since criteria such as the need to resist staining have to be fulfilled and also compared with varnished surfaces if the welding rod is not to be treated with a protective varnish.

The welding rods used today for such coverings do not fulfil the criteria for resistance to physical damage or staining which are fulfilled by the new covering materials themselves. In practice, in order to join the elements of a surface covering coated with a protective varnish, welding rods have to be highly adhesive. To do this, said rods usually contain a high proportion of compounds described as "tackifiers".

Tackifiers are a highly diverse set of compounds that enhance the adhesive properties and the "stickiness to the touch" of compositions into which they are added. Most are amorphous thermoplastic polymers of low molecular weight, derived from synthetic or naturally-occurring monomers.

However, enhancing the rod material's adhesive power for the elements of a surface covering coated with a protective varnish by adding a high proportion of tackifiers, not only makes the material more difficult to scrape off but also makes it stickier for dirt particles and susceptible to staining. In consequence, the welding rod material ages faster than the elements of the surface covering that it is joining. It takes on a darker colour and, as a result, contrasts sharply with the covering (especially if the covering includes a decorative pattern) which compromises the surface's appearance. Moreover, the welding rod material's original appearance cannot be restored by rigorous cleaning, even with a solvent.

Document WO 2007/009733 describes a welding rod for decorative coverings based on ethylene vinyl acetate (EVA) and at least one natural wax. The composition includes 40-75% EVA by weight and has a fluidity index of between 2 g/10 min and 150 g/10 min (measured according to the ASTM 1238 standard).

For rod compositions based on EVA, it is generally accepted that tackifiers have to be added to enhance their adhesive power. However, such tackifiers have a major disadvantage in that they substantially compromise the resistance of such rod materials to both physical damage and staining.

Document GB 2 321 059 describes a hot-melt welding rod for floor coverings which includes 3-25% (by weight) of a mixture of polyvinyl butyral (PVB) and a polymer with a polar core which can form hydrogen bonds with the PVB. The welding rod can be manufactured by extrusion or calendering of the composition because it does not stick to the metal parts of the extrusion or calendering machine. However, this composition has the disadvantage that it is incompatible with surface coverings coated with a protective varnish.

Document JP 2005-54001 describes a composition for a welding rod containing a polyolefin wax (A) with a fluidity index of 1-50 g/10 min, said wax being possibly based on a copolymer of ethyl ethylene acrylate, methyl ethylene acrylate, or methyl ethylene methacrylate, a wax (B) identical to Wax (A) but with a fluidity index of 1-100 g/min, and/or a thermoplastic elastomer (C), a wax (D) which can be a wax of polyethylene or of an ionomer, and a tackifier resin (E).

AIMS OF THE INVENTION

This invention provides a novel hot-melt welding rod for floor coverings, which does not have the prior art drawbacks.

It aims to provide a hot-melt welding rod which sticks strongly to the elements of the floor covering that it is designed to hold together even when said floor covering is coated in a varnish to protect against scratches and staining. The rod according to the invention has to be easy to apply and it should, once in place, be easy to scrape off.

It also aims to provide a hot-melt welding rod which, once it has been applied and excess material has been scraped off after cooling, strongly resists abrasion, scratching and staining, and it should be easy to clean.

It moreover aims to provide a hot-melt welding rod which can be used with any type of floor covering.

SUMMARY OF THE INVENTION

This invention describes a hot-melt welding rod for joining together the elements of a floor covering, containing the following resins:
- at least one copolymer selected from the group of acrylic acid-based, methacrylic acid-based or maleic anhydride-based polymers,
- a polyethylene,
- a copolyamide.

According to specific embodiments of the invention, it presents one or a combination of more than one of the following characteristics:
- at least one of the resins is in the form of a wax,
- the copolymer selected from the group of acrylic acid-based, methacrylic acid-based or maleic anhydride-based polymer is partially or completely neutralised to form an ionomer,
- the acrylic acid-based or methacrylic acid-based copolymer has an acid concentration of 10-20% acid by weight with respect to the total weight of other copolymers,
- the acrylic acid-based or methacrylic acid-based copolymer has an acid concentration of 10% acid by weight with respect to the total weight of other copolymers,
- the maleic acid-based copolymer has an anhydride concentration of 1.3-3.1% with respect to the total weight of other copolymers,
- the copolymer selected from the group of acrylic acid-based, methacrylic acid-based or maleic anhydride-based polymers is a terpolymer,
- the copolyamide is the condensation product of a dimer of fatty acids and an aliphatic diamine,
- the amine index of the copolyamide is higher than its acid value,
- the welding rod comprises between 40% and 74% by weight of a copolymer selected from the group of acrylic acid-based, methacrylic acid-based or maleic anhydride-based polymers, between 10% and 20% polyethylene by weight, and between 10% and 15% of a copolyamide,
- the welding rod comprises between 12.5% and 25% by weight of a copolymer selected from the group of acrylic acid-based, methacrylic acid-based or maleic anhydride-based polymers, between 60% and 72.5% polyethylene by weight, and 15% of a copolyamide,
- the welding rod comprises carnauba or paraffin wax.

This invention also describes a floor covering comprising a seal achieved using the hot-melt welding rod according to the invention.

This invention discloses the use of the hot-melt welding rod according to the invention to join the floor covering elements selected from the group composed of floor coverings based on polyolefin, floor coverings based on PVC, floor coverings based on linoleum and floor coverings based on rubber.

What is meant by a "copolyamide" is a compound generated by the condensation of a dimer of fatty acids and an aliphatic diamine. Preferably, the dimer of fatty acids is generated by the dimerisation of plant-derived, unsaturated fatty acids. Nevertheless, the nature of the copolyamide used in the welding rod according to the invention, as well as how it is generated, could also be those described in Document WO 2004/067668 (which is incorporated by reference).

What is meant by "wax" is a polymer with a Brookfield viscosity of less than 10000 cPoise (centipoise) at 140° C.

For a copolymer comprising acidic groups, the "acid value" (neutralisation number, acid number or acidity) corresponds to the weight (in milligrams) of potassium hydroxide (KOH) needed to neutralise one gram of the polymer (mg KOH per gram). This "acid value" makes it possible to quantify the number of carboxylic acid groups in an acidic compound. Similarly, the "amine index" of a basic polymer corresponds to the weight (in milligrams) of potassium hydroxide (KOH) equivalent to the number of amine groups in one gram of the polymer (mg KOH per gram), and is used to quantify the alkalinity of a chemical compound. These indices are usually determined using a standard method (ASTM D 974).

DETAILED DESCRIPTION OF THE INVENTION

As mentioned above, a hot-melt welding rod for a floor covering, e.g. for the floor surface of any type of building or motor vehicle, has to reconcile numerous criteria which will differ depending on whether the priority is ease of application or easy subsequent upkeep.

To enhance adhesion (which should ensure perfect sealing of elements of the floor covering) and ensure easy scraping off, it could be assumed that the welding rod material should contain low molecular weight—or even very low molecular weight-polymers. In contrast, when it comes to resistance to physical damage (e.g. resistance to scratching), resistance to staining, and flexibility (or elasticity), it could be assumed that the welding rod should be based on higher molecular weight polymers.

Moreover, in order to guarantee better adhesion, the composition of the welding rod should contain polar groups whereas to improve the material's behaviour vis-à-vis dirt and stains, a non-polar composition would be more desirable.

Evaluation Tests

Various compositions were evaluated in adhesion, staining, tar and scratching tests.

The staining test involved depositing an abrasive powder on the scraped welding rod and then soiling the rod material by rubbing the powder in with a cotton cloth (10 passages back and forth) at a force of between 40 N and 50 N. Any excess abrasive powder was then removed. One part of the rod treated in this way was then cleaned without any solvent, using a clean cotton cloth. Another part was cleaned using a cotton cloth that had been dampened in water. The degree of staining of the rod was then evaluated on a scale going from "1" (meaning very heavy staining) to "10" (no staining at all). All the results obtained after cleaning without any solvent are presented side by side with the results obtained after cleaning with water.

The abrasive powder used in the staining test can be of any suitable composition. As an example the dust composition used for tests to compare different welding rod compositions was 38.85% dust, 17.45% Portland cement, 17.7% kaolin, 17.7% quartz, 6.2% Nujol Q14 mineral oil, 0.6% ferric oxide and 1.5% yellow pigment.

Figure 4:
FIG. 4 shows one of today's welding rods after a staining and cleaning test.
Figure 5:
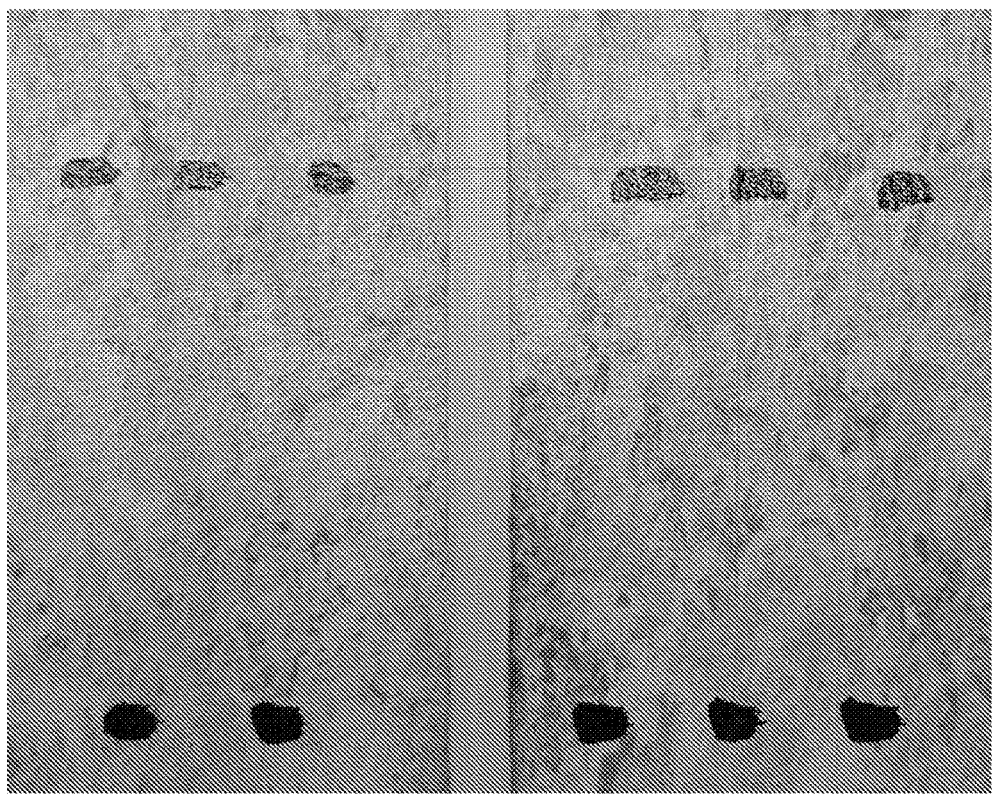
FIG. 5 shows a welding rod according to the invention after a staining and cleaning test.

The tar test involved bringing a drop of fluid tar into contact with the test surface. After an exposure time of thirty minutes, the tar was removed using a cloth and any excess was wiped away using a cloth soaked in isopropanol. The change in the colour of the welding rod was then scored on a scale of "1" (meaning no difference, i.e. restoration of the original colour), "2" (meaning discernible brown discolouration) (FIG. 5), "3" (meaning mild brown discolouration where the tar was in contact with the rod), "4" (dark brown) or "5" (black) (FIG. 4).

Adhesion tests were conducted on a floor covering based on linoleum which is the most difficult to stick together because linoleum is not "thermoplastic" and adhesion depends entirely on mechanical fixation coupled with polar interactions through physical interactions or "chemical interactions" between the surface of the linoleum and the surface of the welding material.

Figure 1:
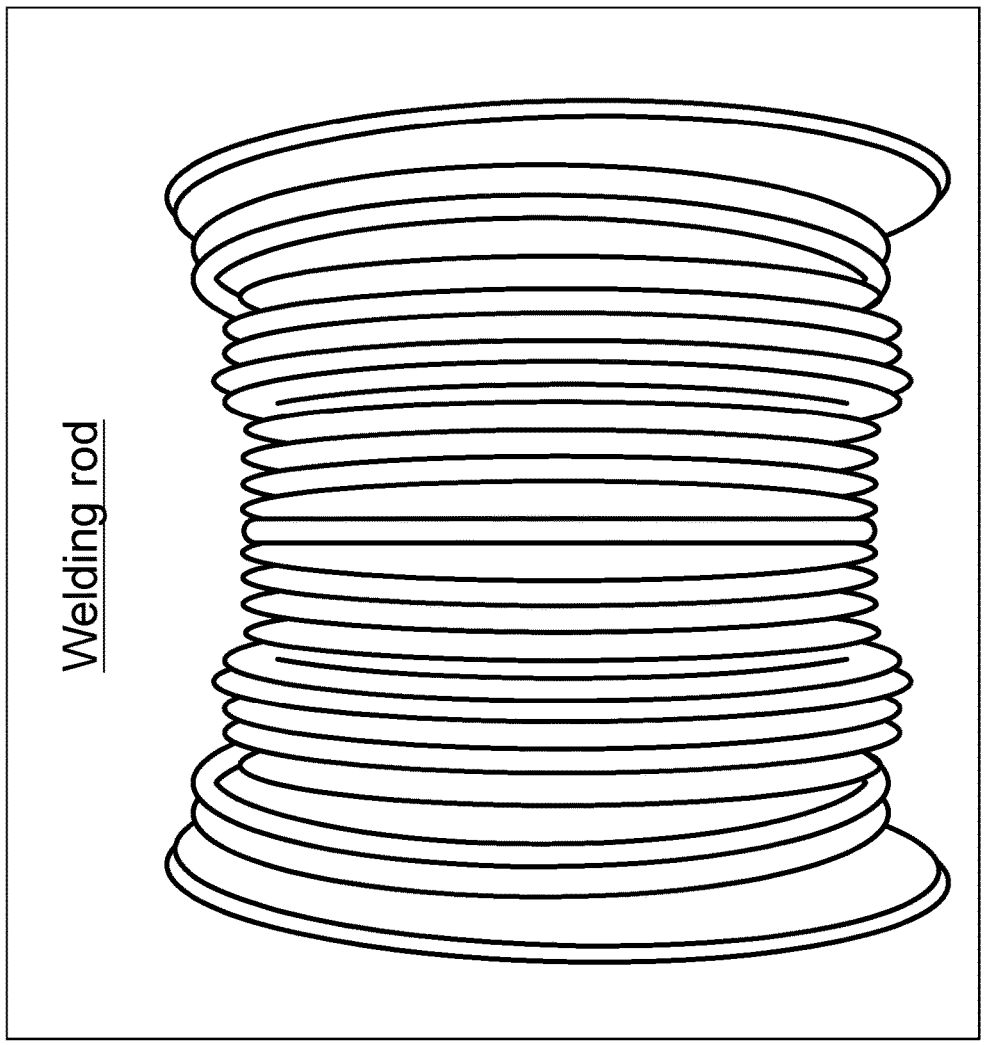
FIG. 1 shows a hot-melt welding rod according to the invention, supplied in roll form.
Figure 2:
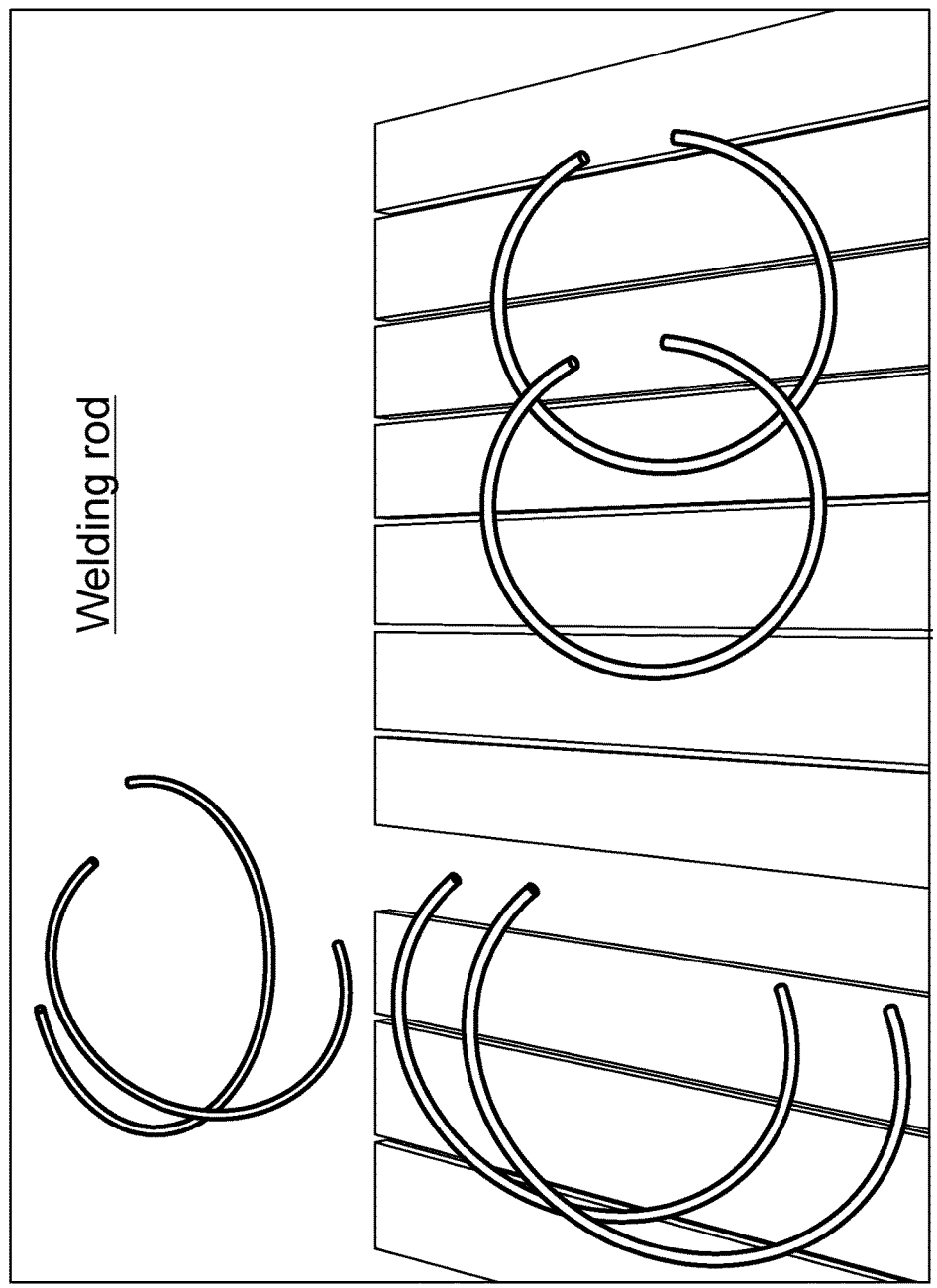
FIG. 2 shows various different hot-melt welding rods.
Figure 3:
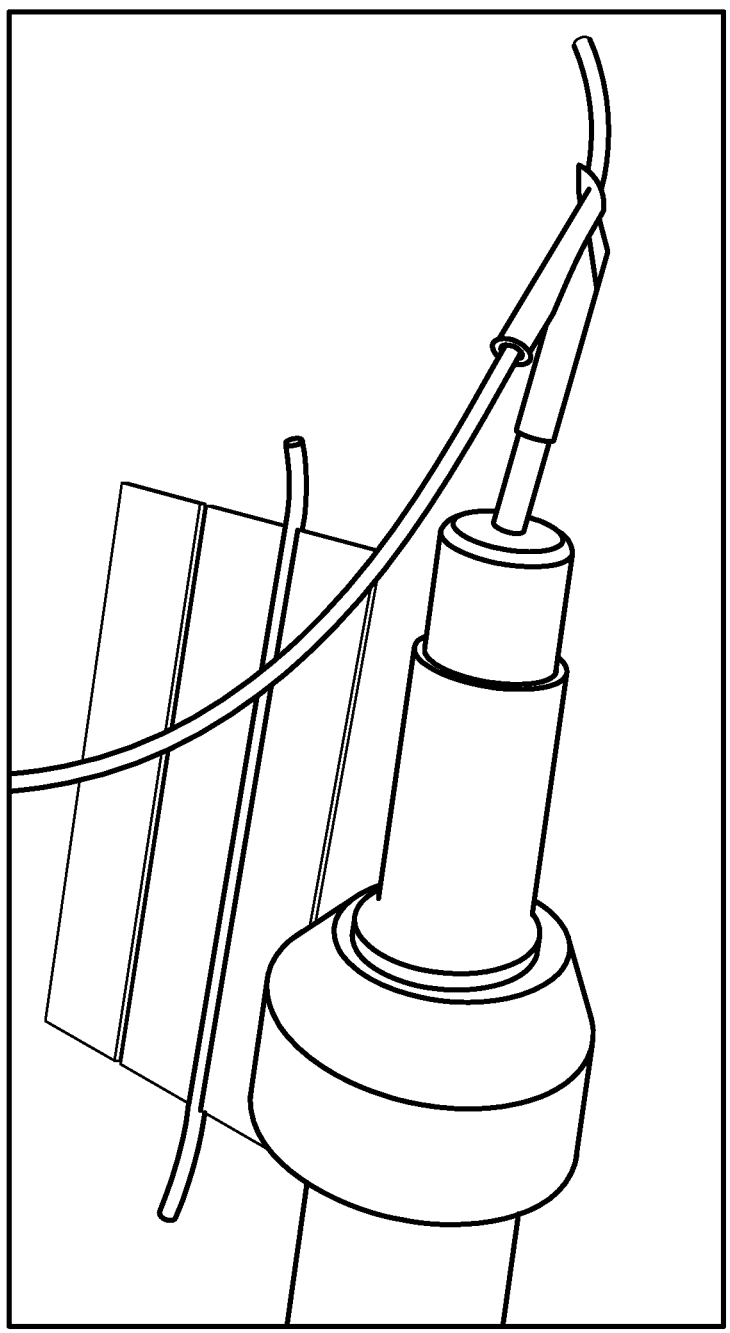
FIG. 3 shows a hot-melt welding rod inside the welding nozzle of a hot-air welding device.

The adhesion test involved cutting a sample of the floor covering in two, using a holder fitted with a blade, through its entire thickness (including the jute backing in the case of linoleum). The two resultant test pieces of the floor covering were separated by about 3 millimeters, a gap which is kept constant to make comparison possible. The test welding rod (FIG. 1 and FIG. 2) was injected into this space using a Leister® hot-air welding device (FIG. 3) to weld the two pieces of surface covering together. After the welding rod material had cooled down, the excess was scraped off and then the force required to pull the two joined pieces apart was measured using an extensometer. The force measurements were made on samples with an edge of 5 centimeters in length (i.e. 5 cm of welded seal) with the welded seal perpendicular to the direction of traction. Adhesion readings are expressed in Newtons per 50 mm length (N/50 mm).

The scratch test or sclerometer test involved using a spring (calibrated in grams) to bring an abrasive pin with a well-defined diameter (of the order of 1 mm) into vertical contact with the surface to be tested for resistance to scratching. The pin was then displaced horizontally across the surface, after which the damage to the surface was evaluated. It is not always possible to evaluate the force at which the surface is first damaged which is why the decision was taken to measure the force at which the appearance of "waves" can first be observed. These waves correspond to the beginning of damage to the welding rod material in the form of superficial tearing. In practice, this "wave" threshold is far easier to determine and, in addition, the results of this type of test are highly reproducible.

To be able to compare the performance of the welding rod according to the invention with that of current welding rods, we performed comparisons with various EVA (ethylene—vinyl acetate)-based compositions. We then tested their resistance to scratches and staining. The proportion of additives in the various compositions ($TiO_2$ in the examples) is given as a percentage with respect to the basic polymer(s) (pcr).

Composition of Welding Rods According to the Prior Art (Comparative Examples)

TABLE 1

| Composition of welding rods based on EVA according to the prior art | | | | | | | | |
|---|---|---|---|---|---|---|---|---|
| Composition | 1 | 2 | 3 | 4 | 5 | 6 | 7 | 8 |
| EVA - 1 | 100 | | 70 | 70 | | | 70 | 70 |
| EVA - 2 | | 100 | | | 85 | 85 | | |
| PE - 1 wax | | | | | | 15 | 15 | |
| PE - 2 wax | | | 15 | 15 | 15 | | | 15 |
| Natural tackifier | | | | 15 | | | | 15 |
| Synthetic tackifier | | | | 15 | | | 15 | |
| $TiO_2$ | 3.5 | 3.5 | 3.5 | 3.5 | 3.5 | 3.5 | 3.5 | 3.5 |

TABLE 2

| Results of adhesion, scratching and staining tests for compositions based on EVA according to the prior art. | | | | | |
|---|---|---|---|---|---|
| Prior art | Test | Staining (dry/water) | Tar | Adhesion (N/50 mm) | Scratching (g) |
| EVA base | 1 | 4/5 | 5 | 150-190 | 500 |
| | 2 | 4/4 | 5 | 160-210 | 350 |
| | 3 | 4/5 | 5 | 270-300 | 300 |
| | 4 | 4/5 | 5 | 250-275 | 400 |
| | 5 | 4/4 | 5 | 100-120 | 350 |
| | 6 | 4/5 | 5 | 100-150 | 400 |
| | 7 | 4/4 | 5 | 180-220 | 350 |
| | 8 | 3/5 | 5 | 300-320 | 650 |

For the staining test (dry/water staining), 1 is very poor and 10 is very good. For the tar test, 5 is poor and 1 is good.

As shown in Table 2, welding rods based on EVA have low adhesive power and their resistance to staining, tar and scratching is moderate. The addition of PE wax (compositions 5-7) and tackifiers (compositions 3, 4, 7 and 8) improves adhesion but does not affect their resistance to scratching or staining.

Composition of Welding Rods According to the Invention

Compositions according to the invention comprising one or more acid-based or anhydride-based polymers, in some cases partially neutralised to generate an ionomer, were produced and then tested for their resistance to physical damage and staining in the same conditions as those used to evaluate the EVA-based compositions according to the prior art.

TABLE 3

Compositions of welding rods according to the invention with a base of approximately 60% polyethylene.

| Composition | 9 | 10 | 11 | 12 | 13 |
|---|---|---|---|---|---|
| LDPE - 1 | 57.5 | 57.5 | 45.0 | 45.0 | 65.0 |
| PE wax - 1 | 15.0 | 15.0 | 15.0 | 15.0 | 15.0 |
| Ionomer |  | 12.5 |  | 25.0 | 5.0 |
| EMAA - 2 | 12.5 |  | 25.0 |  |  |
| PA - 1 | 15.0 | 15.0 | 15.0 | 15.0 | 15.0 |
| $TiO_2$ | 3.5 | 3.5 | 3.5 | 3.5 | 3.5 |

TABLE 4

Compositions of welding rods according to the invention with acidic copolymers, either in totality or alternatively with 15% tackifier.

| Composition | 14 | 15 | 16 | 17 | 18 | 19 |
|---|---|---|---|---|---|---|
| EMAA - 1 | 100 |  |  | 85 |  |  |
| EMAA - 2 |  | 100 |  |  | 85 |  |
| EMAA - 3 |  |  | 100 |  |  | 85 |
| Synthetic tackifier |  |  |  | 15 | 15 | 15 |
| $TiO_2$ | 3.5 | 3.5 | 3.5 | 3.5 | 3.5 | 3.5 |

TABLE 5

Compositions of welding rods according to the invention with 70% acidic copolymers combined with a PE wax and/or an ionomer and/or a tackifier and/or a copolyamide.

| Composition | 20 | 21 | 22 | 23 |
|---|---|---|---|---|
| EMAA - 2 | 70 |  | 70 | 70 |
| EAA - 1 |  | 70 |  |  |
| PE wax - 1 | 15 | 15 | 15 | 15 |
| Synthetic tackifier | 15 | 15 |  |  |
| PA - 1 |  |  | 15 |  |
| PA - 2 |  |  |  | 15 |
| $TiO_2$ | 3.5 | 3.5 | 3.5 | 3.5 |

TABLE 6

Compositions of welding rods according to the invention of acidic or anhydride copolymers combined with the copolyamide (the polyamide is expressed as the fractional weight with respect to 100 parts in weight of the other polymers).

| Composition | 24 | 25 | 26 | 27 | 28 | 29 | 30 | 31 | 32 | 33 |
|---|---|---|---|---|---|---|---|---|---|---|
| EVA - 1 |  |  |  |  |  | 11.0 | 22.0 |  |  |  |
| EMAA - 1 |  |  | 61.0 | 63.5 | 74.0 | 63.0 | 52.0 | 50.0 | 39.0 | 70.0 |
| EMAA - 2 | 61.0 | 70.0 |  |  |  |  |  |  |  |  |
| Acidic terpolymer |  |  |  |  |  |  |  | 11.0 | 21.0 |  |
| PE wax - 1 |  | 15.0 | 13.0 | 13.5 | 13.0 | 13.0 | 13.0 | 13.0 | 13.0 | 15.0 |
| PE wax - 2 |  |  |  |  |  |  |  |  |  |  |
| Ionomer |  |  | 13.0 | 13.5 |  |  |  | 13.0 | 13.0 |  |
| Natural tackifier | 26.0 |  |  |  |  |  |  |  |  |  |
| PA - 1 |  | 15.0 | 13.0 | 9.5 | 13.0 | 13.0 | 13.0 | 13.0 | 13.0 | 15.0 |
| $TiO_2$ | 3.5 | 3.5 | 3.5 | 3.5 | 3.5 | 3.5 | 3.5 | 3.5 | 3.5 | 3.5 |

TABLE 7

Compositions of welding rods according to the invention based on EMAA supplemented with terpolymers, polyethylene and waxes of an ionomer or a copolyamide.

| | | | Composition | | |
|---|---|---|---|---|---|
| | MFI (g/10 min) 190° C. 2.16 kg | Brookfield viscosity (cpoise) | 34 | 35 | 36 |
| EMAA - 1 | 450 |  | 40 | 40 | 40 |
| PE wax - 1 |  | 180 (140° C.) | 13 | 13 | 13 |
| Acidic terpolymer | 5 |  |  | 21 |  |
| Anhydride terpolymer - 1 | 7 |  |  |  | 21 |
| Anhydride terpolymer - 2 | 35 |  |  |  |  |
| EVA - 1 | 20 |  | 21 |  |  |
| Ionomer |  | 80000 (190° C.) | 13 | 13 | 13 |
| PA - 1 |  | 18000 (200° C.) | 13 | 13 | 13 |
| $TiO_2$ |  |  | 3.5 | 3.5 | 3.5 |

Examples of Polymers Used in the Tables Above

For example, the EMAA—1 could be Nucrel 599 from DuPont, EMAA—2 Nucrel 699 from DuPont and EMAA—3 Nucrel 2940 from DuPont.

The EAA—1 could be Primacor 5980I from Dow Chemical or Nucrel 2806 from DuPont.

The synthetic tackifier could be Escorez 5340 from ExxonMobil Chemical. The natural tackifier could be Sylvares TP300 from Arizona Chemical.

LDPE—1 could be Riblene MY00 from Polimeri Europa or Escorene LD 655 from ExxonMobil.

The PE—1 wax could be LD Wax 617 A or LD AC 16 wax or AC 617 wax from Honeywell. The PE—2 wax could be an oxidised Wax AC 316 or AC 325 from Honeywell.

The ionomer could be an ionomer of acrylic acid (Aclyn 285) from Honeywell. Alternatively, the ionomer could be the ionomer of EMAA—1, of EMAA—2 or of EAA—1.

The PA—1 copolyamide could be Euremelt 2840 and the PA—2 could be Euremelt 2140, from Huntsman.

The EVA—1 could be Escorene 2020 and the EVA—2 Escorene 53019 from ExxonMobil Chemical, or alternatively Elvax 410 from DuPont or Evatane 18-500 from Arkema.

The ethylene-acrylate-acid terpolymer could be Bynel 2022 from Dupont. It is mainly characterised by its 10% concentration in acrylic acid. The anhydride-1 terpolymer could be Lotader 3410 from Arkema which is mainly characterised by its 3.1% concentration in maleic anhydride and secondarily characterised by its 17% concentration in acrylate. The anhydride-2 terpolymer could be Lotader 4700 from Arkema which is mainly characterised by its 1.3% concentration in maleic anhydride and secondarily characterised by its 29% concentration in acrylate.

As shown in Table 11, to reconcile the contradictory requirements for a welding rod which has to adhere strongly to a varnished floor covering and, at the same time, has to be resistant to physical damage and staining, the invention proposes—in a novel fashion—using a composition containing one or more polymers selected from the group of polymers based on acrylic acid, methacrylic acid or maleic anhydride.

The fluidity characteristics of a series of polymers used in this invention are shown in Table 10.

TABLE 10

Characteristics of the constituents of the various welding rod compositions.

| Constituent | Viscosity (cps) 140° C. | Fluidity Index (g/10 min) | Vinyl acetate/ or acid (%) |
|---|---|---|---|
| EVA - 1 | | 20 | 20 (VA) |
| EVA - 2 | | 530 | 19 (VA) |
| LDPE - 1 | | 200 | 0 |
| PE wax - 1 | 180 | | 0 |
| PE wax - 2 | 8500 at 150° C. | | 0 |
| Ionomer (sodium) - 1 | 80000 at 190° C. | | — |
| EAA - 1 | | 60 | 18 (AA) |
| Coplyamide (high amine content) - 1 | 18000 at 200° C. | | 0 |
| EMAA - 1 | | 450 | 10 (MAA) |
| EMAA - 2 | | 95 | 11 (MAA) |
| Terpolymer (ethylene-acrylate-acrylic acid) | | 35 | 10 (AA) |

Preferably, the fluidity of the copolymer selected from the group of polymers based on acrylic acid, methacrylic acid or maleic anhydride, has a fluidity index of over 100 g/10 min, advantageously 450 g/10 min or higher.

Results of Measurements Made on the Rods According to the Invention

TABLE 11

Results of tests of adhesion, and of resistance to scratching and staining, for acrylic acid-based, methacrylic acid-based or maleic anhydride-based compositions.

| Composition | Staining (dry/water) | Tar | Adhesion (N/50 mm) | Scratching (g) |
|---|---|---|---|---|
| 9 | 5/7 | 2.5 | 300-310 | 650 |
| 10 | 6/7 | 2 | 250-270 | 700 |
| 11 | 6/8 | 2.5 | 300-320 | 800 |
| 12 | 6/9 | 2 | 270-300 | 700 |
| 13 | 5/7 | 2 | 250-300 | 700 |
| 14 | 6/8 | 3 | 170-200 | 900 |
| 15 | 5/7 | 3 | 190-230 | 1000-1200 |
| 16 | 5/6 | 4 | 120-150 | 1000-1200 |
| 17 | 5/5 | 3.5 | 180-220 | 1000 |

TABLE 11-continued

Results of tests of adhesion, and of resistance to scratching and staining, for acrylic acid-based, methacrylic acid-based or maleic anhydride-based compositions.

| Composition | Staining (dry/water) | Tar | Adhesion (N/50 mm) | Scratching (g) |
|---|---|---|---|---|
| 18 | 5/7 | 3.5 | 290-300 | 1000 |
| 19 | 4/4 | 4 | 270-330 | 1200 |
| 20 | 6/8 | 3 | 250-260 | 1400 |
| 21 | 6/7 | 3.5 | 270-330 | 1400 |
| 22 | 6/8 | 2.5 | 330-375 | 1200 |
| 23 | 5/8 | 2.5 | 320-360 | 1300 |
| 24 | 5/9 | 3 | 180-210 | 1350-1500 |
| 25 | 5/8 | 3 | 300-320 | 1000-1200 |
| 26 | 8/9 | 2 | 300-310 | 1000-1100 |
| 27 | 9/9 | 2 | 300-310 | 10004/9 |
| 28 | 4/9 | 3.5 | 290-320 | 800 |
| 29 | 4/8 | 3.5 | 300-350 | 800 |
| 30 | 4/8 | 3.5 | 310-340 | 700 |
| 31 | 8/8 | 3 | 300-340 | 750 |
| 32 | 6/8 | 2.5 | 280-340 | 1000 |
| 33 | 5.5/8 | 2 | 330-360 | 850 |
| 34 | 4/7 | 3.5 | 200-250 | 450 |
| 35 | 7/8 | 2.5 | 350-375 | 850 |
| 36 | 6/8 | 2 | 320-350 | 800 |

For the staining test (dry/water staining), 1 is very poor and 10 is very good. For the tar test, 5 is poor and 1 is good.

Compositions based on an acidic polymer, in particular based on EAA (ethylene-acrylic acid copolymer) or on EMAA (ethylene-methacrylic acid copolymer), or an anhydride, in particular maleic anhydride, are more resistant to tar, staining and scratches at the same time as being as adherent or slightly more so than those observed with compositions based on EVA according to the prior art, in the case of a composition containing only a polymer with an acid base (compositions 14-19). In any case, compositions based on an acidic or anhydride polymer which also comprise a PE wax and/or a tackifier, are substantially more adherent. Advantageously, the tackifier can be replaced with a copolyamide which enhances resistance to tar, staining and scratching. This improvement could not be obtained with EVA-based compositions. For the two polyamides tested, i.e. PA—1 (amine index=13; acid value=2) and PA—2 (amine index=9; acid value=2), the results are essentially identical.

The acidic and ionic groups of the polymer(s) used in the composition of the welding rods according to the invention, promote adhesion of the composition at high temperature to elements of the surface covering. When the temperature of the material drops back down to room temperature, "free" acidic groups, i.e. those not involved in the adhesion process, can form hydrogen bonds between macromolecules of the polymer, bonds that are 5-10 times stronger than Van der Waals forces. Thus, at room temperature, these polymers have similar physical properties to those of higher molecular weight polymers. Binding energies for ionic bonds are 10-20 times higher than those for the above-mentioned hydrogen bonds.

Thus, surprisingly, using acidic polymers and copolymers and/or their corresponding ionomers, makes it possible to fulfil the dual requirement of low viscosity in the molten state with enhanced resistance to staining and scratches.

Using an acidic polymer or copolymer or an ionomer also has the advantage of conferring a degree of adhesive power equivalent to that obtained with compositions based on acetate polymers such as EVA, while introducing a smaller number of polar groups. Thus, polar groups like acetate residues can advantageously be replaced with acidic groups or ionomers. In practice, unlike an acetate group, an acidic group or an ionomer can strongly interact with the numerous functional acidic or ionic groups in molecules of the surface covering, or even with alkaline groups (e.g. mineral constituents). These bonds are stronger than the dipolar interactions that acetate groups mediate.

Thus, hot-melt welding rods according to the invention are less susceptible to staining and have the advantage that they can be simply wiped clean with a dry cloth.

Preferably, the composition of the rod according to the invention includes an acidic polymer with a concentration of acid of between 10% and 20%, advantageously 10%. In practice, as a general rule, the characteristics of a composition containing an acidic polymer with a concentration of acid of 10% are superior to those of a composition containing an acidic polymer with a concentration of acid of 20%, especially with respect to resistance to tar and staining.

Anhydride or acidic polymers—possibly neutralised to generate the ionomer—in the welding rod according to the invention represent between 12.5% and 70% by weight, polyethylene represents between 13% and 80% by weight, and the copolyamide represents between 9.5% and 15% in weight, with respect to the total weight of all the polymers used.

The polymer(s) according to the invention can be generated in a metallocene-catalysed synthetic pathway.

According to a particular embodiment of the invention, one of the constituents of the welding rod is a wax, i.e. a polymer with a Brookfield viscosity of less than 10000 cPoise (centipoises) at 140° C. Preferably, the constituent that is in the form of a wax is the polyethylene.

Preferably, the welding rod according to the invention contains a "so-called ionomer wax", i.e. a wax derived from ionomer precursors with a fluidity that is in line with the definition of a wax, containing acidic or anhydride groups which may be neutralised by metal cations. Once it has been neutralised by ions, the "so-called ionomer wax" can no longer be in line with the definition of a wax (a Brookfield viscosity of less than 10000 cPoise at 140° C.) because the neutralisation of ionomer precursors entails a loss in fluidity and therefore an increase in viscosity. The "so-called ionomer wax" is used to reinforce the polymer based on an acid or an anhydride and enhances the homogeneity of the composition of the welding rod according to the invention.

In order to further enhance the adhesive power of the hot-melt welding rod according to the invention, rather than adding tackifiers (which substantially compromise a welding rod's resistance to physical damage and staining), a copolyamide can be added instead. Surprisingly, copolyamides can enhance the adhesive power of a composition based on an acidic polymer or an ionomer, vis-à-vis the sub-units of a floor covering, and this despite the fact that the amine groups can, in theory, be neutralised by the acidic groups of the acidic copolymers or ionomers. In consequence, the potential adhesive power contributed by the amine groups would be substantially curtailed because it would no longer be free to interact with the surface of the floor covering.

Preferably, the copolyamide is the product of the polycondensation of a dimer of fatty acids and an aliphatic diamine. Advantageously, the copolyamide has an amine index which is higher than its acid value.

Preferably, the welding rod according to the invention also contains a naturally-occurring wax, advantageously carnauba or paraffin wax. Preferably, the natural wax represents up to 20% extra weight with respect to the total weight of polymers used.

The welding rod according to the invention can also contain additives at proportions in the welding rod (expressed by percentage weight vis-à-vis the rest of the composition) that are preferably below 25%. Such additives could be a lubricating agent, silicone, a mineral bulking agent, an antistatic agent, a UV filter, an antioxidant, a pigment or a mixture of more than one of these. Preferably, the welding rod contains at least one suitable pigment. Advantageously, this could be titanium dioxide ($TiO_2$).

Depending on the type of floor covering, priority can be given to either ease of application and scraping, or ease of upkeep, by adjusting the composition of the hot-melt welding rod.

In a particular embodiment, the hot-melt welding rod according to the invention comprises both an acid-based polymer, a poly-olefin wax, an ionomer, a copolyamide and an acidic terpolymer. Advantageously, it corresponds to Composition N° 31 (Table 6).

The welding rod according to the invention could be produced using any suitable process. Preferably, it is manufactured by extrusion.

The welding rod according to the invention can be used to join any type of surface covering, in particular floor coverings and, more specifically, floor coverings based on linoleum, a polyolefin, PVC or rubber.

Preferably, polyolefin-based surface coverings are coverings whose nature and structures are described in Document EP1567336. In particular, they are coverings made up of multiple layers including a substrate layer based on an olefin polymer, an intermediate layer based on a polymer generated in a metallocene-catalysed synthetic pathway, and a superficial, wear layer based on an ionomer-type polymer; they may also have a top layer coating of polyurethane.

Preferably, rubber-based surface coverings are coverings whose nature and structures are described in European Patent Application N° 07000622.6. In particular, they are coverings based on a mixture of SBS (styrene butadiene styrene) with SBR (a copolymer of butadiene and styrene containing at least 40% styrene by weight) or NBR (nitrile butadiene rubber), and HSR (a copolymer of styrene and butadiene with a high styrene content); they can also contain an ionomeric polymer.

The surface coverings, in particular the floor coverings, of any nature that are joined together with the hot-melt welding rod according to the invention may also contain additives and/or mineral bulking agents or a fire-retardant, e.g. chalk aluminium hydrate, calcite, kaolin, dolomite, silica, silicates or magnesium hydroxide.

The invention claimed is:

1. A hot-melt welding rod, for joining together elements of a floor covering, containing the following resins:
   from 12.5% to 25% by weight of at least one copolymer selected from the group consisting of acrylic acid-based, methacrylic acid-based and maleic anhydride-based copolymers,
   from 60% to 72.5% by weight of two polyethylene resins, one of which is a polyethylene wax having a Brookfield viscosity of less than 10000 cPoise (centipoise) at 140° C.,
   15% by weight of a copolyamide, wherein the copolyamide is the condensation product of a dimer of fatty acids with an aliphatic diamine, and wherein the amine index of the copolyamide is higher than its acid value.

2. The welding rod according to claim 1, wherein the copolymer selected from the group consisting of acrylic acid-based, methacrylic acid-based and maleic anhydride-based polymers, is partially or completely neutralized to form an ionomer.

3. The welding rod according to claim 1, wherein the at least one copolymer comprises acrylic acid-based or methacrylic acid-based copolymer having an acid concentration in the range from 10% to 20% by weight with respect to the other co-monomers.

4. The welding rod according to claim 3, wherein the at least one copolymer comprises acrylic acid-based or methacrylic acid-based copolymer having an acid concentration of 10% by weight with respect to the other co-monomers.

5. The welding rod according to claim 1, wherein the at least one copolymer comprises maleic anhydride-based copolymer having an anhydride concentration of between 1.3% and 3.1% by weight with respect to the other co-monomers.

6. The welding rod according to claim 1, comprising in addition carnauba or paraffin wax.

7. A floor covering comprising floor covering elements joined together using the welding rod according to claim 1.

8. A floor covering as claimed in claim 7, wherein the floor covering elements are selected from the group consisting of floor coverings based on polyolefin, floor coverings based on PVC, floor coverings based on linoleum, and floor coverings based on rubber.

* * * * *

UNITED STATES PATENT AND TRADEMARK OFFICE
CERTIFICATE OF CORRECTION

PATENT NO. : 9,938,399 B2
APPLICATION NO. : 12/742329
DATED : April 10, 2018
INVENTOR(S) : Pierre Bastin et al.

It is certified that error appears in the above-identified patent and that said Letters Patent is hereby corrected as shown below:

In the Claims

In Claim 1, Lines 9-10, delete "140° C.," and replace with --140°C,--

In Claim 6, Line 2, delete "camauba" and replace with --carnauba--

Signed and Sealed this
Second Day of October, 2018

Andrei Iancu
*Director of the United States Patent and Trademark Office*